United States Patent [19]

Wright

[11] Patent Number: 4,607,447

[45] Date of Patent: Aug. 26, 1986

[54] FOOD DECOY MAT FOR WATERFOWL

[76] Inventor: William H. Wright, 919 S. 17th St., Arlington, Va. 22202

[21] Appl. No.: 701,155

[22] Filed: Feb. 13, 1985

[51] Int. Cl.⁴ ............................................. A01M 31/06
[52] U.S. Cl. .................................................. 43/3; 43/2
[58] Field of Search ........................................... 43/2, 3

[56] References Cited

U.S. PATENT DOCUMENTS

| | | | |
|---|---|---|---|
| 1,185,164 | 5/1916 | Batcher | 43/3 |
| 3,186,120 | 6/1965 | Layson | 43/2 |
| 4,023,297 | 5/1977 | Jorgensen | 43/3 |
| 4,550,518 | 11/1985 | Layson | 43/2 |

*Primary Examiner*—Nicholas P. Godici
*Assistant Examiner*—C. McKee
*Attorney, Agent, or Firm*—William H. Wright

[57] ABSTRACT

A food decoy apparatus (10) used to attract waterfowl, wherein the apparatus comprises an enlarged flexible member (11) having transparent portions (12) and opaque portions (13), wherein the opaque portions are representative of scattered individual kernels and/or piles of grain. In addition the apparatus (10) is adapted to be operatively connected to a waterfowl decoy (20) in its deployed position.

19 Claims, 4 Drawing Figures

FOOD DECOY MAT FOR WATERFOWL

TECHNICAL FIELD

This invention relates generally to decoys used to attract and cause waterfowl to land in the general vicinity in which the decoys are disposed.

BACKGROUND ART

Innumerable attempts have been made in the past to provide an attractor or lure for flying waterfowl, that would induce the waterfowl to land in the vicinity of the attraction. These so called attractors are commonly referred to as decoys or bait.

In the past decoys have comprised; clumps of mud, and/or straw; tethered or caged live birds; wooden, plastic, and even solid metal replicas of waterfowl; and sheets or bags of paper or plastic that remotely resembled certain species of geese.

Bait on the other hand has always comprised natural food, since to constitute bait the item must be capable of being ingested by the waterfowl.

At least two prior art devices have been developed wherein a product of nature (specifically whole ears of corn) has been replicated to simulate bait; however, the replication process transforms the end result into a "food decoy".

In order for a "food decoy" to be legal under federal migratory game laws, the "food decoy" must not be capable of being ingested, by the waterfowl that it is intended to attract.

One of the acknowledged unpatented prior art devices, is a plastic replica of a whole shucked ear of corn.

The other acknowledged prior art device which is patented can be seen by reference to U.S. Pat. No. 2,730,828. This patent discloses only the top half of a shucked ear of corn having one or more spikes disposed beneath if for inserting the food decoy into the ground.

Both of these prior art devices, while adequate for their intended purpose leave quite a bit to be desired, due to the fact that they are discrete elements, that in order to be effective must be employed in large numbers, and be carried to, dispersed around, and collected from, the vicinity of the blind that conceals the hunters.

DISCLOSURE OF THE INVENTION

The above stated problems are substantially resolved by the provision of the instant invention. The instant invention comprises a generally flat, transparent, flexible sheet of material having opaque portions formed therein wherein the opaque portions are colored and configured to represent discrete particles of edible material in piled and/or scattered array form.

The aforesaid flexible sheet of material is intended to be rolled for transportation to and from the field, disposed in a generally flat position in either shallow water, or a grain field and is further provided with means to maintain the sheet in a generally flat position.

The transparent portions of the mat allow the flying waterfowl to see the vegetation and/or terrain over which the mat has been placed, and the opaque portions of the mat represent food or bait that has been deposited manually or mechanically thereon.

While this invention may be deployed by itself to attract waterfowl; it is specifically designed to be used in conjunction with decoys that simulate waterfowl, and will be most effective with decoys that simulate feeding waterfowl.

Whether the mat is employed underwater or in grain fields; it is designed to be operatively connected to one or more waterfowl decoys, in a manner that will secure the mat in place, as well as permit its retrieval, as in the underwater deployment.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
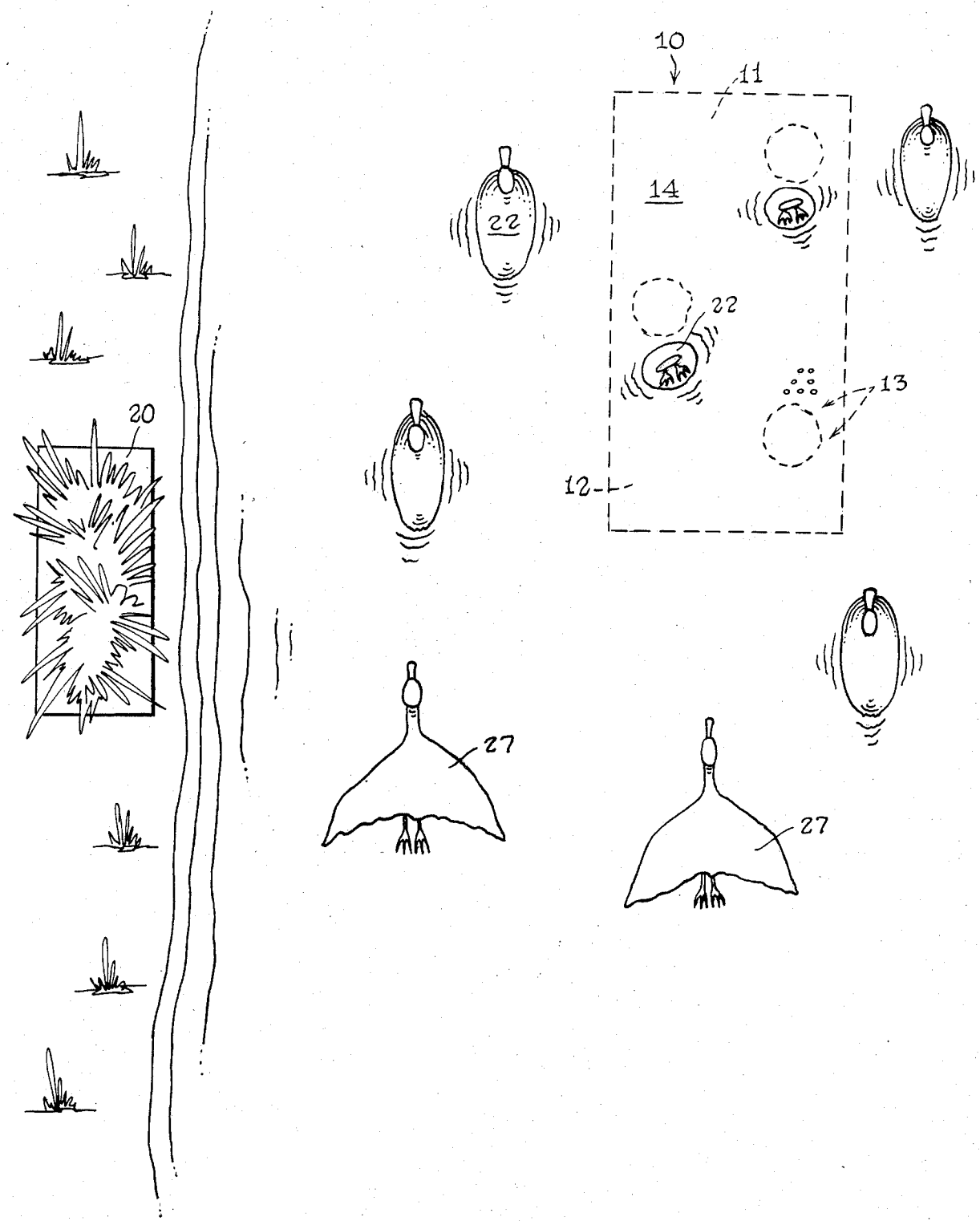
FIG. 1 is an overhead perspective view of the decoy mat submerged in shallow water.

Referring now to the drawings, and in particular to FIG. 1, the apparatus may be seen as depicted generally by numeral 10. The apparatus (10) comprises a generally flat enlarged flexible member (11) having transparent portions designated generally as (12) and opaque portions designated generally as (13).

As shown in the drawings, the enlarged flexible member (11) comprises an elongated generally rectangular mat (14) having a maximum average thickness of ¼". In practice the actual thickness will be substantially less than this value, with the actual thickness being predicated on the strength and weight of the particular material chosen for the fabrication of the mat (14).

In the preferred embodiment of this invention, the enlarged flexible member (11) is fabricated from an elongated sheet (15) of heavy duty, tear resistant, clear plastic, having a plurality of apertures (16) disposed around its periphery. The transparent portions (12) of the member (11) will coincide with the unaltered portions of the clear plastic.

The opaque portions (13) of the member (11) comprise: a large number "n" of relatively small and randomly scattered colored portions (17) of the sheet (15), which represent individual kernels of grain such as corn or the like; and, a lesser number "M" of relatively large and randomly scattered colored portions (18) of the sheet (15), which represent piles of individual kernels of grain, such as corn or the like.

The opaque portions (13) may be formed: by physically impregnating the clear plastic sheet (15) with a pigmented material; by coating selected portions of the underside of a single sheet (15) with a pigmented material that will be permanently affixed thereto; or, by laminating two thin plastic sheets (15) together wherein the opaque portions (13) are provided intermediate the exterior surfaces of the laminated sheets (15). It is very important to note, that regardless of the method chosen for the creation of the opaque portions (13), the end product must be incapable of ingestion, in part, or in whole, by the waterfowl that the apparatus (10) is intended to attract.

As mentioned supra the preferred configuration of the enlarged flexible member (11) is an elongated rectangular shape. The reasons for the choice of this particular configuration are: due to the flexible nature of the material, the elongated sheet (15) may be rolled up into a compact bundle, for transportation to and from a blind (20); the width of the elongated sheet may be chosen, so that the width is less than the average spacing between rows of corn, and the sheet (15) can be unrolled between the rows of harvested corn, thereby presenting a natural appearance; and, this particular configuration is suitable for deployment in both field and water blind situations.

Using current farming practices as a guide, the width of the elongated flexible member for use in cornfields should have a maximum value of 18" order that the apparatus (10) may be readily disposed between the individual rows of corn stalks.

It should also be noted that while a rectangular configuration is the preferred shape for the aforementioned reasons; this invention also contemplates other geometric configurations; particularly in instances wherein the apparatus is to be deployed solely in the vicinity of a water blind.

In those instances, a large surface area circular or eliptical configuration would be more desirable. This is particularly true, due to the fact that the water conditions will normally distort the waterfowls perception of the apparatus (10); and also due to the normal absence of underwater vegetation in the vicinity of a water blind.

Figure 2:
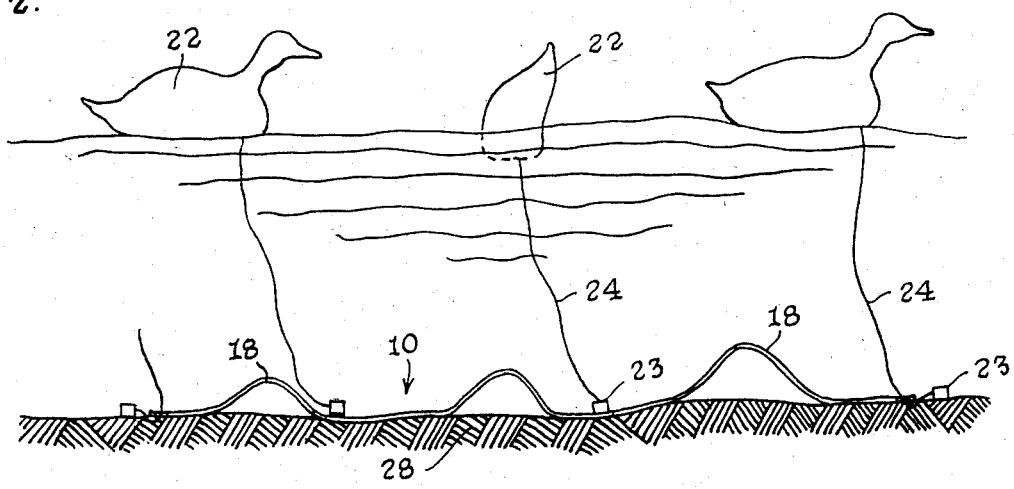
FIG. 2 is a side view of the submerged decoy mat.
Figure 3:
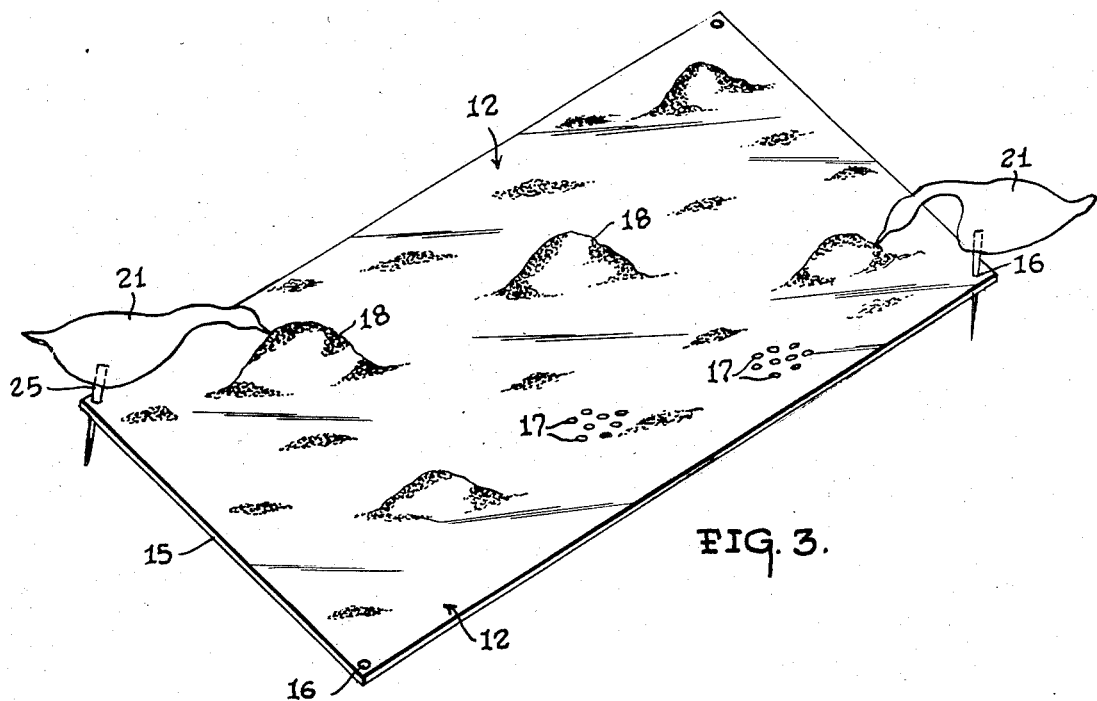
FIG. 3 is a perspective view of the decoy mat.
Figure 4:
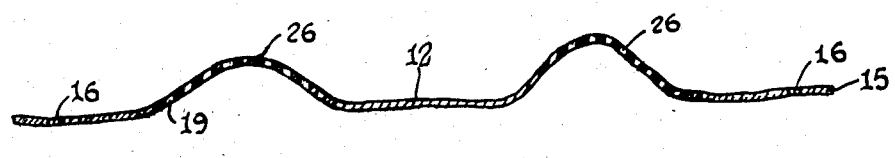
FIG. 4 is a cross-sectional view of the decoy mat.

As can best be seen by reference to FIGS. 2 thru 4, the apertures (16) in the sheet (15) are used alternately as anchoring means or retrieval means in conjunction with a field decoy (21) or a floating decoy (22) respectively.

As shown in FIG. 2, the floating decoy (22) is connected to a decoy weight or anchor (23) via a length of string or cord (24). The apertures (16) are dimensioned such that they will accomodate the cord (24); however, they will not accomodate either the decoy weight (23) or the decoy (22) itself. While other decoy weights may be rested upon the apparatus (10) to keep it submerged; it is the weight of the sheet (15) itself, that is relied upon to maintain its submerged position.

When the apparatus (10) is to be retrieved, all that is required is that one of the decoys (22) having its cord (24) extending through one of the apertures (16) be grasped, and its anchor (23) brought into engagement with the bottom (19) of the apparatus (10). Continued pulling on the anchor cord (24) will raise the apparatus (10) above the surface, so that it can be retrieved without submerging ones hands.

As shown in FIG. 3, a field decoy (21) is normally provided with a pointed stake (25) that anchors the decoy into the ground. In this instance the field decoys (21) anchor the apparatus (10), by having a plurality of the decoy stakes (25) extending through a like plurality of the apertures (16) in the appparatus (10). This arrangement prevents the apparatus from flapping around in strong wind gusts.

In both of the aformentioned situations, the decoys (21) and (22) would logically (if they were real) congregate around a food source, and their presence while natural, also provides a ulititarian function or purpose.

As can be seen in FIGS. 2 thru 4, this invention also contemplates creating a relief pattern coinciding with the opaque portions (13) of the apparatus (10). This relief pattern is created by distorting the generally flat surface of the sheet (15) to create raised surfaces (26) giving the illusion of depth, to the representation of the individual and piled kernels of grain.

As explained earlier in the specification, the transparent portions (12) of the apparatus occupy a substantial portion of the surface area of the apparatus (10) and allow waterfowl (27) passing overhead to see the actual surface (28), and they will land in an attempt to consume that food.

Having thereby described the subject matter of this invention, it should be obvious that many substitutions, modifications and variations of the invention are possible in light of the above teachings. It is therefore to be understood that, within the scope of the appended claims, the invention may be practiced otherwise than as specifically described.

What I claim is:

1. A food decoy apparatus equally effective on dry land and an underwater environment to attract waterfowl to fields and to shallow water areas, wherein the decoy apparatus comprises:
    an enlarged flexible member having transparent portions and opaque portions, wherein at least some of the opaque portions are generally mound shaped protrusions rising from the otherwise flat surface of said flexible member, and self supportive in use, said opaque portions being representative, with respect to both size and coloration, of kernels of grain.

2. A food decoy apparatus as in claim 1; wherein, the enlarged flexible member comprises:
    at least one elongated sheet of clear plastic having opaque portions formed therein 3. A food decoy apparatus as in claim 2; wherein, at least the one elongated sheet is further provided with a plurality of apertures around its periphery.

4. A food decoy apparatus as in claim 1; wherein, the enlarged flexible member has a generally rectangular configuration.

5. A food decoy apparatus as in claim 1; wherein, the enlarged flexible member has a generally circular configuration.

6. A food decoy apparatus as in claim 1; wherein, the opaque portions comprise a large number "n" of relatively small and randomly scattered colored portions, which represent individual kernels of grain.

7. A food decoy apparatus as in claim 1; wherein, the opaque portions comprise a number "m" of relatively large and randomly scattered colored portions, which represent piles of individual kernels of grain.

8. A food decoy apparatus as in claim 6; wherein, the opaque portions further comprise a lesser number "m" of relatively large and randomly scattered colored portions, which represent piles of individual kernels of grain.

9. A food decoy apparatus equally effective on dry land and in an underwater environment in combination with at least one waterfowl decoy wherein, the combined decoys are used to attract waterfowl to fields and to shallow water areas, wherein the food decoy apparatus comprises:
    an enlarged flexible member having transparent portions and opaque portions, wherein at least some of the opaque portions are generally mound shaped protrusions rising from the otherwise flat surface of said flexible member, and self supportive in use, said opaque portions are representative with respect to both size and coloration, of an edible substance.

10. The combination of claim 9, wherein, the enlarged flexible member comprises:

an elongated sheet of clear plastic hving opaque portions formed therein

11. The combination of claim 10; wherein, the elongated sheet is further provided with a plurality of apertures around its perihery.

12. The combination of claim 9; wherein, the enlarged flexible member has a generally rectangular configuration.

13. The combination of claim 9; wherein, the enlarged flexible has a generally circular configuration.

14. The combination of claim 9; wherein, the enlarged flexible member has a generally eliptical configuration.

15. The combination of claim 9; wherein, the opaque portions comprise a large number "n" of relatively small and randomly scattered colored portions, which represent individual kernels of grain.

16. The combination of claim 9; wherein, the opaque portions comprise a number "m" of relatively large and randomly scattered colored portions, which represent piles of individual kernels of grain.

17. The combination of claim 15; wherein, the opaque portions further comprise a lesser number "m" of relatively large and randomly scattered colored portions, which represent piles of individual kernels of grain.

18. The combination of claim 11; wherein, the at least one waterfowl decoy comprises a decoy body, a decoy line and a decoy weight, and each of the said aperatures in said elongated sheet is dimensioned to receive only the decoy line.

19. The combination of claim 11; wherein, that at least one waterfowl decoy comprises a decoy body mounted on a pointed stake, and each of the said apertures in said elongated sheet is dimensioned to receive said pointed stake.

* * * * *